US010329181B2

(12) United States Patent
Ogawa

(10) Patent No.: US 10,329,181 B2
(45) Date of Patent: Jun. 25, 2019

(54) METHOD FOR CONTROLLING AERATION VOLUME IN ACTIVATED SLUDGE

(71) Applicant: Ogawa Environmental Research Institute Inc., Kanagawa (JP)

(72) Inventor: Takao Ogawa, Kanagawa (JP)

(73) Assignee: Ogawa Environmental Research Institute Inc., Kanagawa (JP)

( * ) Notice: Subject to any disclaimer, the term of this patent is extended or adjusted under 35 U.S.C. 154(b) by 132 days.

(21) Appl. No.: 15/303,442

(22) PCT Filed: Aug. 29, 2016

(86) PCT No.: PCT/JP2016/075116
§ 371 (c)(1),
(2) Date: Oct. 11, 2016

(87) PCT Pub. No.: WO2017/104182
PCT Pub. Date: Jun. 22, 2017

(65) Prior Publication Data
US 2018/0016170 A1    Jan. 18, 2018

(30) Foreign Application Priority Data

Apr. 23, 2016  (JP) ................. 2016-086625

(51) Int. Cl.
*C02F 3/00* (2006.01)
*C02F 3/12* (2006.01)
*C02F 3/34* (2006.01)

(52) U.S. Cl.
CPC ............ *C02F 3/006* (2013.01); *C02F 3/12* (2013.01); *C02F 3/1278* (2013.01); *C02F 3/34* (2013.01);
(Continued)

(58) Field of Classification Search
CPC .......... C02F 3/006; C02F 3/12; C02F 3/1278; C02F 2209/00; C02F 2209/08; C02F 2209/22
(Continued)

(56) References Cited

U.S. PATENT DOCUMENTS 3,617,537 A * 11/1971 Vermette .................. C02F 3/12
                                                    210/120
4,818,408 A *  4/1989 Hamamoto ............. C02F 3/006
                                                    210/614
(Continued)

FOREIGN PATENT DOCUMENTS

JP        2909723 B2     6/1999
JP        2006-116480    5/2006
(Continued)

OTHER PUBLICATIONS

Katsumi Moriyama et al., "Hyoujun kassei odeiho ni chisso jokyo kinou wo fukasuru furyo seigyo sisutemu [Airflow control system that adds nitrogen removal function to standard activated sludge process]", Gesuido Kenkyu Happyokai Koenshuu [Compilation of lectures of Sewer Workshop] vol. 45, pp. 725-727, 2008 (3 pages).
(Continued)

*Primary Examiner* — Claire A Norris
*Assistant Examiner* — Julia L. Wun
(74) *Attorney, Agent, or Firm* — Nakanishi IP Associates, LLC

(57) ABSTRACT

A method for appropriately controlling an aeration volume for activated sludge on which aeration treatment is conducted while DO of an activated sludge mixed liquor in an aeration tank is being adjusted to substantially 0 mg/l (ultralow DO treatment). The method includes the following steps. An aeration volume correlation (G=F(Gr)) between an aeration tank and a measuring device is acquired in advance.
(Continued)

A sample of activated sludge mixed liquor taken during ultralow DO treatment operation is temporarily intensely aerated in the measuring device and then aeration is stopped. Based on temporal changes in the measuring device DO value, an oxygen consumption rate Rr and an equilibrium DO value C1 are calculated. An appropriate aeration volume G2* of the testing device is acquired by using an Ea–G relationship formula and the like obtained in advance. An appropriate aeration volume Gr2* of the aeration tank is obtained by using the relationship G=F(Gr).

1 Claim, 5 Drawing Sheets

(52) U.S. Cl.
CPC ...... *C02F 2209/08* (2013.01); *C02F 2209/22* (2013.01); *C02F 2209/38* (2013.01); *Y02W 10/15* (2015.05)

(58) Field of Classification Search
USPC .................................................. 210/614, 739
See application file for complete search history.

(56) References Cited

U.S. PATENT DOCUMENTS

| | | | | |
|---|---|---|---|---|
| 5,552,319 A | * | 9/1996 | Yang | ........................ C02F 3/006 |
| | | | | 435/286.5 |
| 6,689,274 B1 | * | 2/2004 | Northrop | .................. C02F 3/00 |
| | | | | 210/601 |

FOREIGN PATENT DOCUMENTS

| | | |
|---|---|---|
| JP | 2009-226234 A | 10/2009 |
| JP | 2011-005354 A | 1/2011 |
| JP | 2014-83524 A | 5/2014 |
| JP | 5749413 B1 | 7/2015 |
| JP | 5833791 B1 | 12/2015 |
| JP | 2016-007577 | 1/2016 |

OTHER PUBLICATIONS

International Search Report issued in PCT/JP2016/075116, dated Nov. 8, 2016, with translation (5 pages).
Written Opinion of the International Searching Authority issued in PCT/JP2016/075116, dated Nov. 8, 2016 (4 pages).
Extended European Search Report issued in European Patent Application No. 16863199.2, dated Apr. 17, 2018 (8 pages).

\* cited by examiner

[Fig. 1]
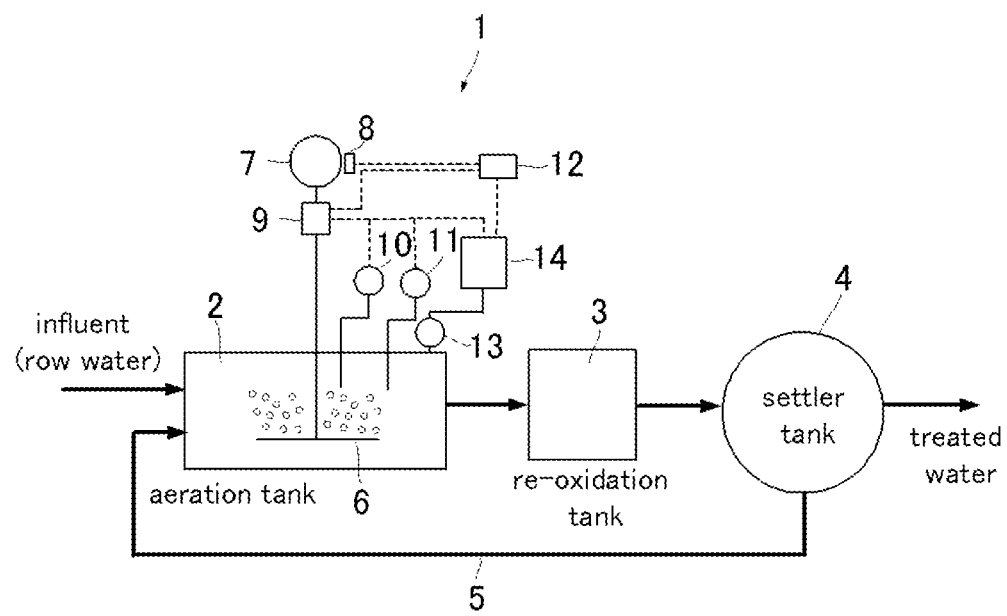

[Fig. 2]
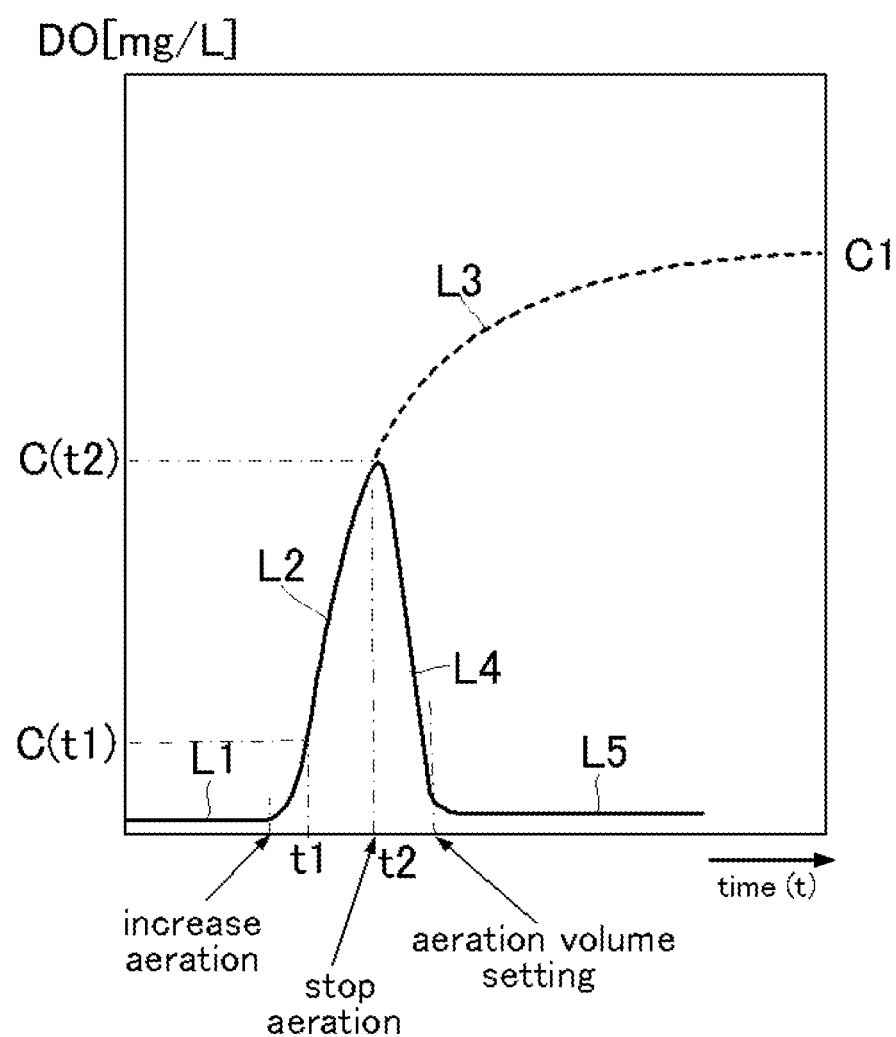

[Fig. 3]
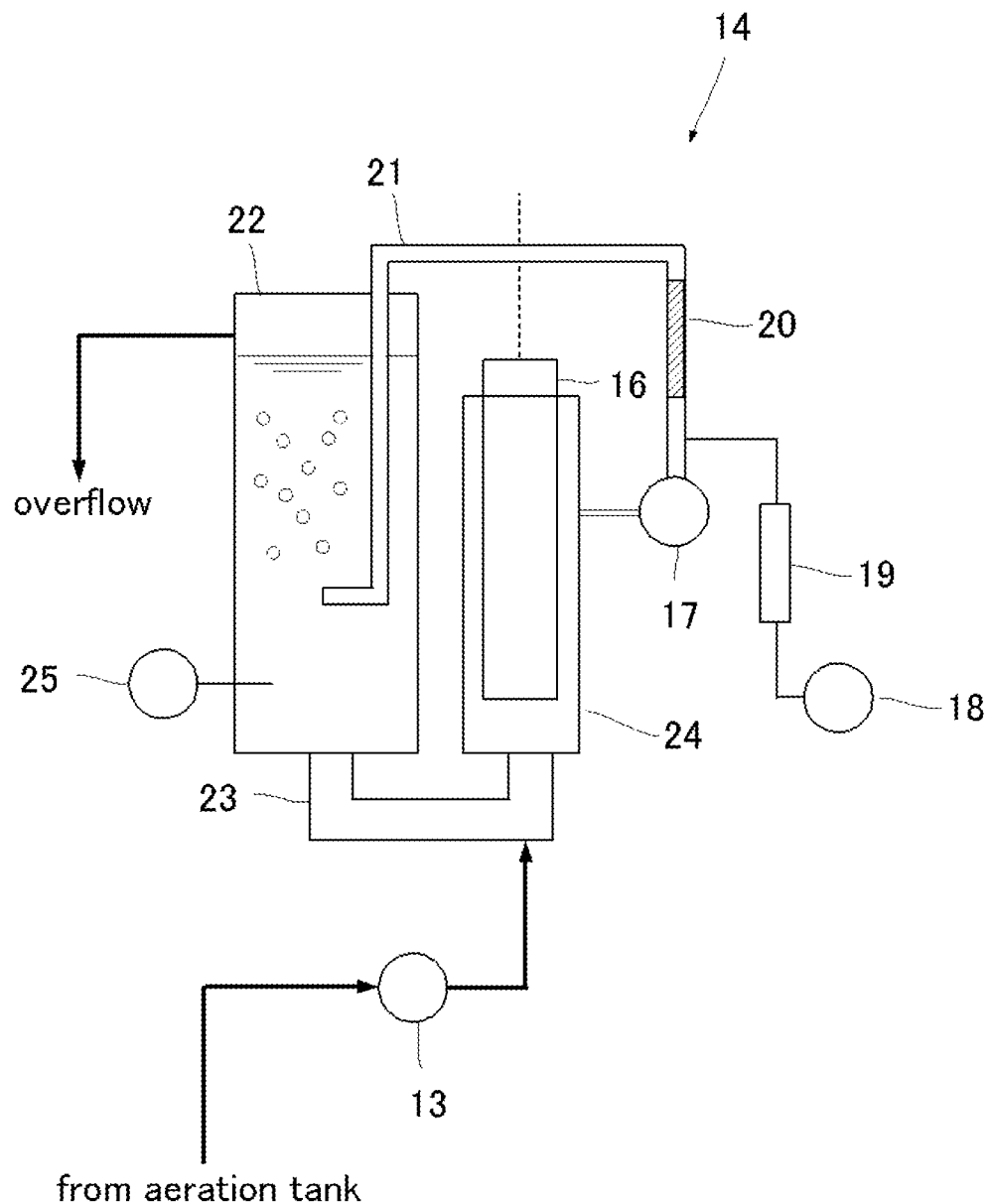

[Fig. 4]
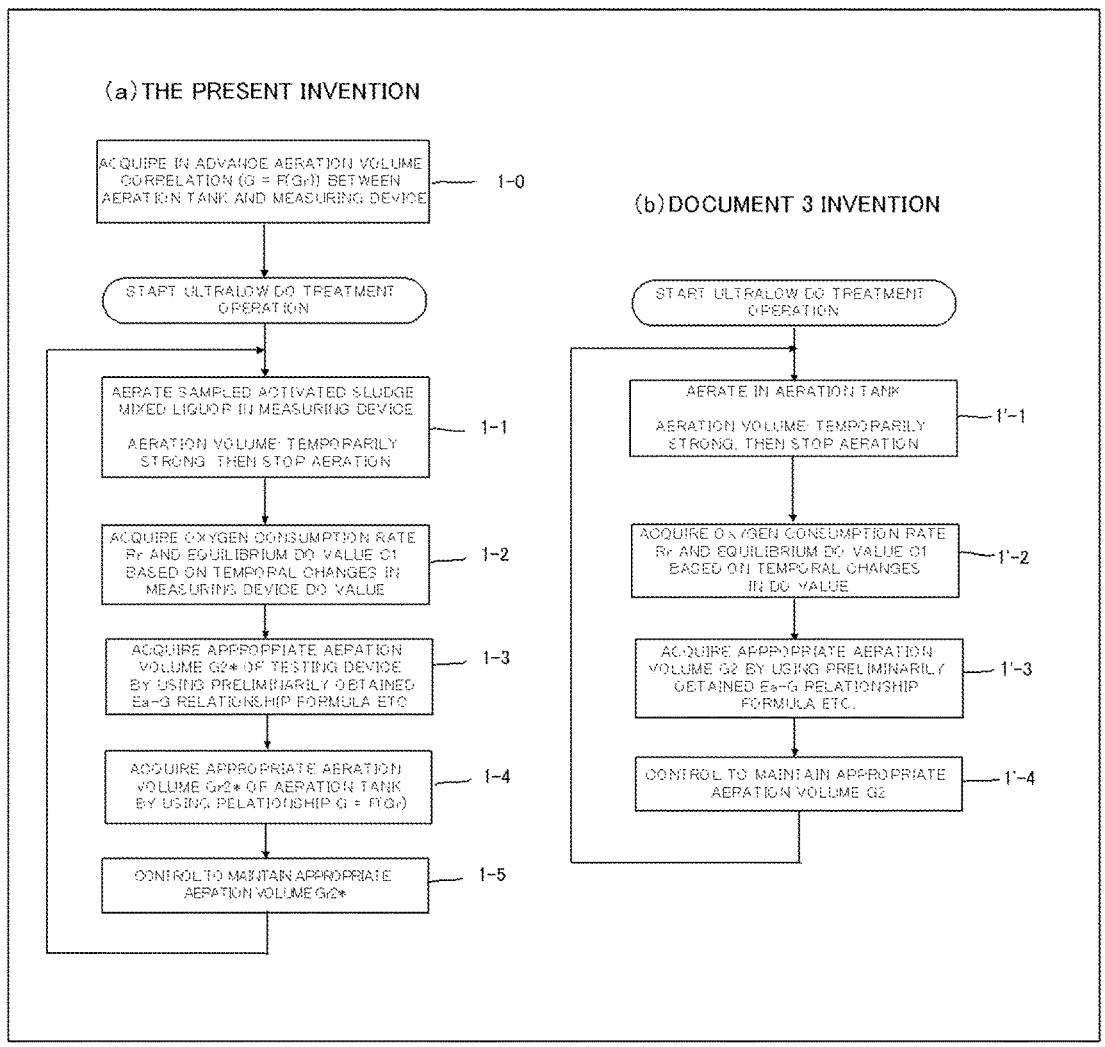

[Fig. 5]
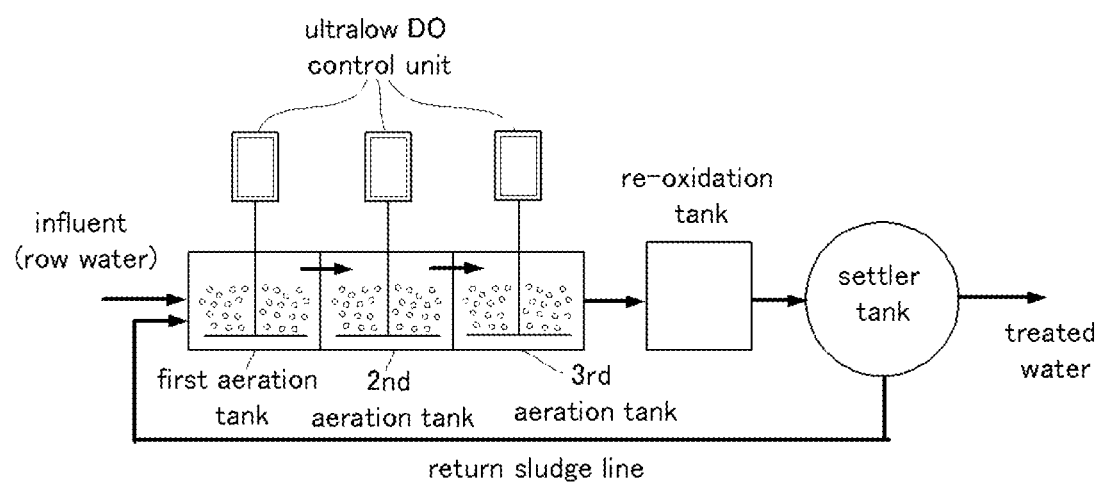

METHOD FOR CONTROLLING AERATION VOLUME IN ACTIVATED SLUDGE

TECHNICAL FIELD

The present invention relates to a method for controlling the aeration volume in activated sludge and, in particular, to a method for controlling the aeration volume in a treatment apparatus that treats BOD components in wastewater with microorganisms or simultaneously treats BOD components and denitrification.

BACKGROUND ART

A dissolved oxygen concentration (hereinafter referred to as DO) in activated sludge in an aeration tank is generally about 2 [mg/l] during operation; however, operating at a DO of about 0 [mg/l] is beneficial in that power needed for aeration can be saved and the BOD treatment and the denitrification treatment can be performed simultaneously. In general, aeration volume control is performed by measuring DO of the aeration tank and determining an appropriate aeration volume on the basis of the measured value; however, when the DO value of the aeration tank is about 0.5 mg/l or less, it is difficult to know the accurate oxygen consumption-supply balance from the DO value and it is difficult to accurately maintain the dissolved oxygen state in the aeration tank. Thus, it has been difficult heretofore to implement low DO operation control.

As a related art concerning low DO operation control, there has been disclosed a technique of controlling DO in the aeration tank to low DO on the basis of the treated water BOD, the predicted treated water BOD value calculated from the oxygen consumption rate of sludge, and the nitrate ion concentration (for example, PTL 1).

There has been a report of a case in which airflow control is conducted by using, as a parameter, a coenzyme nicotinamide adenine dinucleotide (NADH) involved in respiration of activated sludge microorganisms so as to control DO in the aeration tank to be within the range of 0.2 mg/l to 0.6 mg/l and to thereby remove nitrogen from municipal sewage by about 75% (for example, NPL 1).

An NADH sensor is a relatively new sensor capable of measuring changes in the aerobic range to the anaerobic range not detectable with DO meters but has a drawback in that it is affected by suspended substances in the wastewater and the measured values have variation. There has been proposed a method for reducing the control error caused by variation of the NAND sensor (for example, PTL 2).

For typical activated sludge, a method of removing BOD alone or simultaneously removing BOD and nitrogen by low DO operation is a process that provides substantial benefits if it can be controlled appropriately; however, under current circumstances, when raw water has fluctuations in concentration, composition, etc., the BOD treatment and the denitrification treatment are difficult to stably maintain.

In order to accurately carry out BOD/denitrification simultaneous treatment by low DO operation, not only control through DO meters but also accurate tracking of the amount of oxygen supplied by aeration corresponding to the influent fluctuations and changes in operation conditions is critical.

The applicant of the subject application has solved these problems and conceived a method for stably controlling ultralow DO operation for BOD/denitrification simultaneous treatment, and has obtained a patent (PTL 3).

CITATION LIST

Patent Literature

PTL 1: Japanese Unexamined Patent Application Publication No. 2011-005354
PTL 2: Japanese Unexamined Patent Application Publication No. 2014-83524
PTL 3: Japanese Patent No. 5833791

Non Patent Literature

NPL 1: Katsumi Moriyama et al., "Hyoujun kassei odeiho ni chisso jokyo kinou wo fukasuru furyo seigyo sisutemu [Airflow control system that adds nitrogen removal function to standard activated sludge process]", Gesuido Kenkyu Happyokai Koenshuu [Compilation of lectures of Sewer Workshop] vol. 45, pp 725-727, 2008

DISCLOSURE OF INVENTION

Technical Problem

Although the method of PTL 3 (hereinafter Document 3) is a breakthrough technology in the BOD/denitrification simultaneous treatment field, the method has a room for further improvements in actual application regarding the following points.

First, since the aforementioned method uses a DO meter immersed in the aeration tank in measuring C1 (equilibrium DO value at the time of intense aeration) described below, measurement is conducted in the aeration tank in a state in which separation of bubbles is insufficient due to aeration and thus there is moderate variation in measured values due to bubbles hitting the electrode surfaces. Thus analytic accuracy of the measurement is desirably improved.

Moreover, one operation of measuring the appropriate aeration volume takes about 10 minutes. Since the aeration tank DO value temporarily deviates from the appropriate range during this operation, the frequency of measuring through this operation is limited. Thus, further improvements are desirable in order to apply this method to activated sludge treatment that involves large raw water load fluctuation.

Solution to Problem

The applicant of the subject application has conducted extensive studies on further improvements of the invention described in Document 3 and conceived a technology that resolves the problem described above. The present invention can be summarized as follows:

A method for controlling an aeration volume in an activated sludge treatment apparatus configured to remove BOD in wastewater or simultaneously remove BOD and nitrogen components in wastewater by performing aeration treatment while a dissolved oxygen concentration (hereinafter referred to as DO) of an activated sludge mixed liquor in an aeration tank is maintained at 0.5 mg/l or lower (hereinafter this treatment is referred to as ultralow DO treatment), the method comprising:

(1-0) acquiring an aeration volume correlation in advance
wherein an aeration volume measuring device (hereinafter referred to as the measuring device) that samples the activated sludge mixed liquor in the aeration tank into inside the device and aerates the sampled liquor to determine an appropriate aeration volume is used so as to acquire, in advance and for a necessary range, a correlation (G=F(Gr)) between an aeration volume Gr in the aeration tank and an aeration volume G in the measuring device at which a DO value of the aeration tank equals a DO value of the measuring device;

(1-1) performing aeration operation in the measuring device during ultralow DO treatment operation wherein the activated sludge mixed liquor is sampled into the measuring device from the aeration tank in ultralow DO treatment operation and aerated at an aeration volume G1 (G1>G2) to increase DO of the activated sludge mixed liquor, and then aeration is stopped, where G2 represents an aeration volume of the measuring device corresponding to an aeration volume Gr2 of the aeration tank at the time of this operation (G2=F(Gr2));

(1-2) acquiring oxygen consumption rate Rr and equilibrium DO value C1 wherein, where a temporal change in DO value (C), (dC(t)/dt), is expressed by formula (1):

$$dC(t)/dt = K_L a(Cs - C(t)) - Rr \quad \text{formula (1)}$$

where KLa is an overall mass transfer coefficient, Cs is a saturated dissolved oxygen concentration, and Rr is an oxygen consumption rate of the activated sludge mixed liquor under an aerobic condition, (1-2-1) Rr is obtained on a basis of changes in C(t) during a DO decreasing process when aeration is stopped, and (1-2-2) an equilibrium DO value C1 (dC(t)/dt=0, C(t)=C1) under temporarily intensified aeration is obtained by repeat calculation by varying KLa or C1 on a basis of changes in C(t) during a DO increasing process under intensified aeration and a relationship of formula (2):

$$K_L a(Cs - C1) = Rr \quad \text{formula (2);}$$

(1-3) acquiring an appropriate aeration volume G2 of the measuring device wherein, based on an analogy from the fact that an aeration volume G0 at which an oxygen supply capacity by aeration equals an oxygen consumption rate of the mixed liquor is obtained by formula (3') where G1 represents an aeration volume under temporarily intensified aeration and Ea1 represents an oxygen dissolution efficiency at that time, an appropriate aeration volume G2* in the measuring device during ultralow DO treatment operation is obtained by repeat calculation using formula (3):

$$G0 = ((Cs - C1)/Cs) \cdot (Ea1/Ea0) \cdot G1 \quad \text{formula (3')}$$

$$G2^* = k \cdot ((Cs - C1)/Cs) \cdot (Ea1/Ea2) \cdot G1 \quad \text{formula (3)}$$

where Ea0 and Ea2 are respectively oxygen dissolution efficiencies at aeration volumes G0 and G2* and can be acquired from a relationship formula of Ea and G obtained in advance by experiments or the like, and where k is a proportionality factor that derives the appropriate aeration volume G2* under the ultralow DO treatment condition from the calculated appropriate aeration volume based on analogy from formula (3'), an optimum value of k for each treatment condition is acquired in advance by measuring appropriate aeration volumes under various treatment conditions, and an optimum value of k corresponding to the ultralow DO treatment condition is substituted into formula (3);

(1-4) acquiring an appropriate aeration volume Gr2* of the aeration tank wherein an aeration volume Gr2* of the aeration tank corresponding to the aeration volume G2* of the measuring device obtained in (1-3) is obtained from the correlation (G2*=F(Gr2*)); and (1-5) controlling to maintain appropriate aeration volume operation of setting the aeration volume of the aeration tank to the appropriate aeration volume Gr2* obtained in (1-4) is carried out as needed so as to appropriately maintain the aeration volume in ultralow DO treatment operation.

Specific features of the invention of the subject application will now be described in further detail. In the description below, "wastewater" is a general term for any contaminated water that needs to be treated. The "wastewater" subject to the treatment and introduced to the treatment apparatus is referred to as "influent" (or row water).

The operation of (1-1) to (1-3) described above is referred to as "aeration volume calibration".

Typically, the amount of oxygen supplied to the activated sludge is controlled on the basis of the DO value of the activated sludge mixed liquor in the aeration tank. In the case of air aeration, the DO value is controlled to about 0.5 mg/l to about 3 mg/l. In contrast, in ultralow DO control according to the present invention, operation is carried out while controlling DO in the aeration tank to about 0 [mg/l].

The DO measurement in the aeration tank is performed while an electrode of a DO meter is immersed in the activated sludge mixed liquor being aerated in the aeration tank. The measured DO value is a value determined by the balance between the oxygen consumption rate of microorganisms in the activated sludge mixed liquor and the oxygen supply rate of aeration etc.

When the DO value is about 0.5 mg/l or lower, the change in DO is very small relative to the change in the aeration volume and the effects of various factors, such as response speed of the electrode of the DO meter, microbubbles contacting the electrode surface, and locality of the dissolved oxygen concentration, become relatively large. Thus, the above-described balance can no longer be accurately reflected. In particular, at an ultra low DO value of about 0.1 mg/l, administration of the amount of oxygen supplied by aeration is practically impossible by the control based on the readings of the DO meter.

<Acquiring in Advance Aeration Volume Correlation Between Aeration Tank and Measuring Device>

In the present invention, the relationship between the aeration volume (Gr) in the aeration tank in operation and the aeration volume (G) in the measuring device is determined in advance and stored in the computer of the measuring device of the present invention. The relationship (Gr–G) between the two aeration volumes can be quantified as follows. In the description below, the index (a, b, c, or the like) is a symbol that indicates the time point at which the aeration volume is measured. Moreover, at is an abbreviation of the aeration tank.

First, a DO value (DOat) of the activated sludge mixed liquor being aerated at an aeration volume Gra in the aeration tank is measured. The activated sludge mixed liquor is sampled into the measuring device and the sampled activated sludge mixed liquor is aerated by using the aeration device within the measuring device so as to measure the changes in DO value. If DO>DOat, the aeration volume is decreased. If DO<DOat, the aeration volume is increased. Then the aeration volume Ga when DO=DOat in an equilibrium state is determined. If it takes a long time to be DO=DOat, then this operation is started over considering the relationship between the aeration volume and DO found thus far so that the measurement can be completed within a period of time in which the oxygen consumption rate of the activated sludge mixed liquor does not change by aeration. As such, the value of the aeration volume Ga of the measuring device at which the same aeration effect as that achieved at a particular Gra value is determined. Next, the value of Gra is changed and the aeration tank DOat at this value and the aeration volume Ga of the measuring device when the measuring device DO equals DOat is determined.

As Gra decreases, DOat decreases. As DOat decreases to about 0.5 mg/l or less, the difference between DOat and DO decreases. Since the measured value includes error, the accurate aeration volume Ga can no longer be measured. DOat corresponding to Gra is dependent on the oxygen consumption rate of the activated sludge mixed liquor, and the oxygen consumption rate is affected by the BOD load of the raw water to be treated with the activated sludge. Thus, when Gra is small and DOat decreases to about 0.5 mg/l, the operation mode is preliminarily adjusted so that the raw water BOD load is decreased. In this manner, even with small Gra, a DO value high enough to enable accurate measurement of DOat can be obtained.

As described above, the correspondence between Gra and Ga in the aeration volume range (necessary range) that may be used in the activated sludge process operation is measured, the Gra–Ga relationship formula is obtained through plotting a line graph or the like, and the formula is stored in the computer of the measuring device.

<Aeration Operation of Sampled Liquor During Ultralow DO Treatment Operation>

The aeration volume needed for ultralow DO control is measured and analyzed as follows.

The activated sludge mixed liquor aerated at an aeration volume (Grb) at a particular point in time is sampled into the measuring device. Then using the Gr–G relationship formula, the activated sludge mixed liquor is aerated at G1 larger than the value of G corresponding to Grb. G1 is favorably about twice as large as G. Due to intense aeration, DO of the activated sludge mixed liquor increases as indicated by a curve L2 in FIG. 2. Once DO has increased to a sufficient level, aeration is stopped. After aeration is stopped, DO decreases substantially linearly as indicated by L4 in FIG. 2.

Next, by using formulae (1) to (9), Rr is calculated from the rate of decrease of L4, KLa is calculated from Rr and changes in L2, and an appropriate aeration volume G2 needed for ultralow DO control within the measuring device is determined from Rr, KLa, etc. Furthermore, the relationship formula of Gr and G is used to determine Grc of the aeration tank corresponding to G2. The details are described below.

<Relationship Between Operation of Increasing and Decreasing Aeration Volume and KLa, Rr, and C1>

The temporal changes (dC(t)/dt) in DO value (C) of the activated sludge mixed liquor in the aeration tank under intensified aeration is expressed by formula (1) where KLa is the overall mass transfer coefficient, Cs is the saturated dissolved oxygen concentration, and Rr is the oxygen consumption rate of the activated sludge mixed liquor:

$$dC(t)/dt = K_L a(C_s - C(t)) - Rr \quad \text{Formula (1)}$$

Rr is considered to be constant if the change in aeration volume is for a short period of time. Moreover, Cs can be treated as a constant since the temperature does not change during a short period during which aeration volume calibration is carried out. When formula (1) is integrated, the change in C(t) can be expressed by formula (5) where C0 represents an initial value. In the ultralow DO treatment, C0 is substantially 0.

$$C(t) = C1 - (C1 - C0) \cdot \exp(-K_L a \cdot t) \quad \text{Formula (5)}$$

In this formula, C1 represents a DO value when t is sufficiently extended and the oxygen supply rate KLa(Cs−C(t)) equals the oxygen consumption rate Rr of the activated sludge mixed liquor as expressed by the relationship of formula (2):

$$K_L a(C_s - C1) = Rr \quad \text{formula (2)}$$

<Acquisition of Rr and Calculation of KLa and C1>

Referring to FIG. 2, if aeration is increased from the state of DO value L1 during performance of the ultralow DO treatment, DO follows the curve L3 calculated by formula (5) and increases as indicated by L2.

Formula (5) gives formula (6) where the DO value a time t1 after start of increasing aeration is represented by C(t1) and the DO value a time t2 after start of increasing aeration is represented by C(t2):

[Math. 1]

$$K_L a = \frac{1}{t_2 - t_1} \ln \frac{C_1 - C(t1)}{C_1 - C(t2)} \quad \text{Formula (6)}$$

When aeration is stopped, the DO value changes as indicated by L4 where KLa=0 in formula (1). The oxygen consumption rate Rr is substantially constant independent from DO until DO decreases to about 0.5 mg/l. Thus, by stopping aeration and measuring the decreasing rate of the DO decreasing process, the oxygen consumption rate Rr of the activated sludge mixed liquor can be determined (corresponds to (1-2-1) mentioned above).

Since C1=Cs−Rr/KLa from formula (2), formula (6) can be expressed as follows:

[Math. 2]

$$K_L a = \frac{1}{t_2 - t_1} \ln \frac{(C_s - R_r/K_L a) - C(t1)}{(C_s - R_r/K_L a) - C(t2)} \quad \text{Formula (6a)}$$

By using Rr determined from the DO decreasing rate measurement at the time aeration is stopped, repeat calculation is performed by varying KLa so as to determine KLa at which formula (6a) is established.

By using KLa thus determined and Rr, C1 can be determined from formula (2) (corresponds to (1-2-2) mentioned above).

Another way of determining C1 is that, since KLa=Rr/(Cs−C1) from formula (2), formula (6) can also be expressed as follows:

[Math. 3]

$$\frac{R_r}{C_s - C_1} = \frac{1}{t_2 - t_1} \ln \frac{C_1 - C(t1)}{C_1 - C(t2)} \quad \text{Formula (6b)}$$

Thus, C1 at which formula (6b) is established can be determined by repeat calculation by varying C1 (corresponds to (1-2-2) mentioned above).

<Calculation of Appropriate Aeration Volume During Ultralow DO Treatment Operation>

The relationship between KLa, the aeration volume G, and the oxygen dissolution efficiency Ea is expressed by formula (7) based on the oxygen content balance. This formula is based on the descriptions in "Sewage Testing Method [Gesui Shiken Hoho]" and "Sewer Facility Design Plan—Design Guide and Commentary", Japan Sewage Works Association.

[Math. 4]

$$Ea = \frac{C_S \cdot K_L a \cdot V \times 10^{-3}}{G \cdot \rho} \times 100 \quad \text{Formula (7)}$$

In the formula, V is the effective capacity of the aeration tank and ρ is the oxygen density in air.

Formula (2) can be rewritten as formula (8) if the aeration volume G1 and the oxygen dissolution efficiency Ea1 at that time are used in formula (7):

$$Rr = \gamma \cdot Ea1 \cdot G1 \cdot (Cs - C1) \quad \text{Formula (8)}$$

where $\gamma = \rho/(Cs \cdot V \times 10^{-1})$

Since the DO value C(t) of the aeration tank is substantially 0 when the oxygen supply capacity at the aeration volume G equals the oxygen consumption rate of the activated sludge mixed liquor, formula (9) is derived when the aeration volume at that time is represented by G0 and the oxygen dissolution efficiency at that time is represented by Ea0:

$$Rr = \gamma \cdot Ea0 \cdot G0 \cdot Cs \quad \text{Formula (9)}$$

From formulae (8) and (9), $$G0 = ((Cs - C1)/Cs) \cdot (Ea1/Ea0) \cdot G1 \quad \text{Formula (3')}$$

Then the aeration volume G0 at the time when the oxygen supply capacity equals the oxygen consumption rate of the activated sludge mixed liquor can be determined from formula (3').

When BOD is to be treated without conducting denitrification, the amount of oxygen supplied by aeration must be about the same as the oxygen consumption G0 of the activated sludge mixed liquor in order to avoid oxygen deficiency.

Moreover, for efficient denitrification, operation must be conducted such that the amount of oxygen supplied by aeration is about the same as the oxygen consumption G0 of the activated sludge mixed liquor or less. In this manner, if the aeration airflow during the ultralow DO treatment operation is represented by G2, the oxygen dissolution efficiency at that time is represented by Ea2, and k is the proportionality factor of about 1 or less, the appropriate aeration airflow G2 can be deduced from formula (3) by substituting G0 and Ea0 in formula (3') by G2 (=k·G0) and Ea2:

$$G2 = k \cdot ((Cs - C1)/Cs) \cdot (Ea1/Ea2) \cdot G1 \quad \text{Formula (3)}$$

<Regarding Oxygen Dissolution Efficiency Ea>

The oxygen dissolution efficiency Ea is a characteristic dependent on the water depth of the aeration tank and the type and structure of the diffuser pipe, and is a value specific to the activated sludge apparatus. Within the appropriate service range, Ea is high if the aeration volume G is low, and Ea is low if the aeration volume G is high (specific G-Ea relationship is described in Document 3 (FIG. 4)). Thus, the relationship formula for Ea and G is determined in advance through experiments and the like and stored in the computer so that in conducting calculation using formula (3), G2 is assumed and Ea2 at that time is determined from the relationship formula for Ea and G. By using the obtained Ea2, G2 is determined from Formula (3), and repeat calculation is continued until the result matches the assumed G2. As a result, a correct G2 can be acquired.

<Regarding Proportionality Factor k>

In formula (3), k is a factor that determines what aeration volume is appropriate with respect to the theoretical aeration volume G0 at which the amount oxygen supplied by aeration equals the oxygen consumption. In the case of BOD single treatment, k is either 1 or a value close to 1 but not less than 1.

In the case of BOD/denitrification simultaneous treatment, the following considerations are necessary. In order to induce denitrification reaction, microorganisms must be put in a dissolved-oxygen-deficient environment in which the microorganisms are forced to obtain oxygen from NOx-N. Denitrification no longer happens in an aerobic environment where DO is about 0.5 mg/l or higher.

Meanwhile, in order to induce denitrification, ammonia nitrogen must be nitrified into nitrous acid nitrogen or nitrate nitrogen in advance. The nitrification reaction rate is known to be high at a high DO and low at a low DO. Excessive oxygen deficiency causes rapid degradation of treated water BOD.

In the ultralow DO treatment, the above-described three effects are achieved by forming an oxygen concentration gradient from the surface of the activated sludge floc toward the center of the interior. Even when oxygen supply is moderately excessive on average for the entire aeration tank, the center of the interior of a large floc is in an oxygen deficient state and thus BOD/denitrification simultaneous treatment is possible. If the oxygen consumption rate for the BOD decomposition is large, the center of the interior of even a relatively small floc can create an oxygen deficient environment; thus, the value k is about 1 or less.

The size of the floc, the oxygen consumption rate for BOD decomposition, the relationship between DO and the nitrification reaction rate, and other factors are specific to individual activated sludge and thus the optimum value for k is different for each case. The value of k also differs depending on the role of the ultralow DO treatment played in the overall structure of the treatment apparatus. For example, when activated sludge process involves three aeration tanks connected in series (refer to Example 3 of Document 3), k is preferably controlled at a value of 1 or less in a first aeration tank and a second aeration tank where denitrification is mainly conducted, and k is preferably controlled at a value of 1 or more in a third aeration tank where BOD treatment is mainly conducted. When a re-oxidation tank (refer to FIG. 5) is provided after the apparatus of Example 3, it is effective to assign BOD treatment and maintaining nitrification activity to the re-oxidation tank and adjust k to a value slightly smaller than 1 so that denitrification can also be conducted in the third aeration tank in the case of incomplete denitrification.

Since the value of k slightly differs depending on various factors of individual activated sludge, it is ultimately practical to decide the k value through experiment.

<Features of the Present Invention as Compared to the Invention in Document 3>

Next, features of the present invention are described by comparing the invention to the invention of Document 3. Referring to FIG. 4, the difference between the two inventions are whether a measuring device is provided, the positions where DO values are measured, and whether the aeration volume correlation is acquired in advance.

That is, according to the invention described in Document 3, the DO value measurement for the aeration volume calibration is conducted by using the DO meter inside the aeration tank (1'-1 and 1'-2 in (b) of FIG. 4), and the appropriate aeration volume G2 is acquired based on this value (1'-3 in the same drawing). In contrast, according to the present invention, the DO value measurement for the aeration volume calibration is conducted by using a DO meter of a measuring device (1-1 and 1-2 in (a) of FIG. 4), the appropriate aeration volume $G2^*$ of the measuring device is acquired (1-3 in the same drawing), and the aeration volume $Gr2^*$ of the actual aeration tank is determined from the correlation ($G2^*=F(Gr2^*)$) on the basis of the acquired appropriate aeration volume $G2^*$ (1-4 in the same drawing).

Due to such innovative features, the present invention achieves the following notable improvements compared to the invention in Document 3.

Since the activated sludge mixed liquor being aerated in the aeration tank is partly drawn into a container inside a measuring device and DO of the activated sludge mixed liquor is measured with the measuring device in which bubble separation is conducted, variation in DO value can be substantially eliminated and thus measurement accuracy is improved.

Moreover, since the amount of sludge needed for the aeration volume calibration in the measuring device is about 1 L, which is a very small amount of sample compared to the amount of sludge in the entire activated sludge, the operation conditions of the actual facility are rarely affected. Thus, the aeration volume calibration can be repeated about every 10 minutes, which is the length of time required for one calibration operation. In this manner, the measurement frequency can be notably increased and appropriate control can be further easily implemented even on activated sludge with large raw water load fluctuations.

Advantageous Effects of Invention

According to the present invention, a significant energy conservation effect can be achieved through reducing the aeration volume and ultralow DO control from which BOD/denitrification simultaneous treatment can be expected can be facilitated.

BRIEF DESCRIPTION OF DRAWINGS

FIG. 1 is a diagram illustrating a biological treatment apparatus 1 according to one embodiment of the present invention.

FIG. 2 is a graph indicating changes in DO during aeration volume calibration operation.

FIG. 3 is a diagram illustrating a measuring device according to the present invention.

FIG. 4 includes flowcharts that compare the present invention to the invention described in Document 3.

FIG. 5 is a diagram illustrating an aeration tank having an elongated structure in which multiple ultralow DO treatment apparatuses of the present invention are installed.

DESCRIPTION OF EMBODIMENTS

The aeration volume controlling method in ultralow DO treatment according to the present invention will now be described in further detail with reference to FIG. 1. Naturally, the scope of the present invention is defined by the claim and not by the embodiments described below.

(Overall Structure of BOD/Denitrification Simultaneous Treatment Apparatus)

Referring to FIG. 1, an activated sludge treatment apparatus 1 according to this embodiment includes, as major constituent units, an aeration tank 2 in which ultralow DO treatment that involves removing BOD in the influent and denitrifying nitrogen components is performed, a re-oxidation tank 3 in which the effluent from the aeration tank 2 is aerated at a sufficient dissolved oxygen concentration, a settler tank 4, a return sludge line 5 through which the sludge returns from the settler tank 4 to the aeration tank 2.

The re-oxidation tank 3 is not always needed depending on the purpose of the treatment but is preferably installed if higher quality treated water is necessary, back-up for the ultralow DO treatment is necessary, or a high nitrifying rate is necessary due to high nitrogen load. The aeration tank 2 is equipped with a diffuser pipe 6, an aeration blower 7, an inverter 8 that automatically adjusts the aeration volume of the aeration blower 7, an aeration meter 9, and a thermometer 10 and a DO meter 11 that measure the temperature and DO of the activated sludge mixed liquor in the aeration tank. The aeration tank 2 is also equipped with a controller 12 that administers the measured values input from these meters and controls the inverter 8 of the aeration blower 7 and a measuring device 14 that samples the activated sludge mixed liquor from the aeration tank to conduct measurement and analysis.

The re-oxidation tank 3 is equipped with an independent aeration blower, an aeration volume controlling device, and a diffuser pipe not illustrated in the drawing.

The aeration volume control may be done by other methods depending on the aeration system. For example, the opening of the automatic valve that adjusts the aeration volume may be controlled by using the aeration volume meter or, in the case of a surface aeration system, the rotation speed of the motor and the like may be controlled.

The aeration tank 2 performs ultralow DO treatment operation by controlling the amount of oxygen supplied by aeration to a value acquired by the method of the present invention. The re-aeration tank 3 is operated while maintaining the DO level of the aeration tank to about 2 mg/l to about 4 mg/l so that the operation is conducted with a sufficient amount of oxygen supplied.

A computer (not illustrated) of the controller 12 stores formulae etc. used to convert the appropriate aeration volume signal from the measuring device 14 into the inverter output of the aeration device, etc.

A computer (not illustrated) in the measuring device 14 stores the k values related to aeration volume calibration operation, formulae of the relationship between the aeration volume and the oxygen dissolution efficiency, the relational tables of the temperature and the saturated dissolved oxygen concentration, etc., determined in advance.

Referring to FIG. 3, the measuring device 14 according to this embodiment includes, as major constituent units, a lifting pump 13 that samples activated sludge mixed liquor from the aeration tank, a DO meter 16 that measures DO of the activated sludge mixed liquor, a circulation pump 17 and an aeration compressor 18 that circulate and aerate the activated sludge mixed liquor, a flow meter 19 that measures the aeration volume, a line mixer 20 for aeration, an aeration pipework 21, an aeration vessel 22 for aeration and bubble separation of the activated sludge mixed liquor, a connecting pipe 23, a measurement container 24 for measuring DO of the circulating aerated liquor, and a thermometer 25 that measures the temperature of the activated sludge mixed liquor.

(Ultralow DO Treatment Controlling Method)

An ultralow DO treatment controlling method in the treatment apparatus 1 will now be described.

In the aeration tank 2, during the ultralow DO treatment operation, the activated sludge mixed liquor in the aeration tank is introduced into the measuring device 14 by operating the lifting pump 13.

The value Gr of the aeration volume from the aeration meter 9, the DO (DOat) value from the DO meter 10 immersed in the aeration tank, and the temperature from the thermometer 11 are input to the computer of the measuring device 14. DOat is used to determine the relationship between Gr and G in (1-0).

Since the DO value (DOat) during the aeration volume calibration operation is acquired from the DO meter 16 in the measurement container 24, DOat from the DO meter 10 is not necessary during the aeration volume calibration operation but, in order to examine whether appropriate control is conducted, is preferably retrieved at this stage also. The temperature of the aeration volume calibration operation is acquired from the thermometer 25 in the measurement container 24; alternatively, the temperature may be acquired from the thermometer 11 since the temperature difference is small. Comparing the temperatures from the thermometers 11 and 25 is advantageous since whether sampling of the sludge is appropriately conducted can be examined by the comparison.

Next, the lifting pump 13 is stopped, the temperature T of the activated sludge mixed liquor sampled into the measurement container 24 is acquired from the thermometer 25, and the aeration compressor 18 of the measuring device 14 is operated to aerate the sampled liquor at an aeration volume G1. The value of the aeration volume G1 is preferably larger than, namely, about twice as large as, the aeration volume G2 of the measuring device corresponding to Gr.

The DO value (C(t)) of the activated sludge mixed liquor that increases with time is acquired from the DO meter 16. As soon as the value C(t) increases to about 1.5 mg/l or higher, aeration is stopped and Rr is calculated on the basis of the C(t) decreasing rate. Based on Rr and data regarding the C(t) increasing process, KLa is calculated from formula (6a).

Then C1 is calculated from formula (2) by using the calculated values KLa and Rr. Then a set aeration volume G2* is calculated based on formula (3) by using Eat at G1, Cs at the temperature T, the value k, and Ea2 at G2. The aeration volume Gr2* of the aeration tank corresponding to G2* is determined by the computer of the measuring device 14. Then the inverter 8 is controlled by the controller 12 on the basis of the relationship between the inverter output and the aeration volume so that the aeration volume by the aeration blower equals the set aeration volume Gr2*. Alternatively, the inverter 8 may be controlled by the computer of the measuring device 14.

In the case of a continuous type anaerobic/aerobic BOD/denitrification simultaneous treatment aeration tank, the denitrification tank is operated in an anaerobic environment and thus the aerobic tank and the anaerobic tank need to be completely partitioned. However, the only difference between the aeration tank and the re-aeration tank used in ultralow DO treatment is the intensity of aeration; thus, when the aeration tank has an elongated structure in the flow direction from the inflow end to the outflow end and the employed aeration method involves little agitation and mixing between the upstream side and the downstream side, such as disperser pipe aeration, it is possible to use the inflow side of one aeration tank to perform the ultralow DO treatment operation and use the outflow side of the same aeration tank as the re-oxidation tank.

Even in the case of a batch method or a continuous method that uses a completely mixed tank as the aeration tank, a sufficient function can be achieved as long as there is one unit (hereinafter, a control unit) that includes a section (9, 13, or 14 in FIG. 1) where the aeration volume calibration operation for the ultralow DO treatment is conducted and a section (7, 8, 9, or 12 in FIG. 1) where the aeration volume control is conducted. However, in the case of a continuous method that uses an aeration tank having an elongated structure in the flow direction from the inflow end to the outflow end, Rr changes in the flow direction and the entire system may not be sufficiently controlled by a single control unit. In such a case, as illustrated in FIG. 5, it is effective to provide two or more control units installed along the flow direction from the inflow end to the outflow end of the elongated aeration tank and independently control these units. In this case also, partitioning the aeration tank for each of the control units is not necessary.

INDUSTRIAL APPLICABILITY

The present invention is applicable to aeration volume control of a direct flow-type biological denitrification system, a nitrification liquid circulating-type biological denitrification system, and a batch-type biological denitrification system that use aerobic microorganisms. Naturally, the present invention is also applicable to operation that does not involve denitrification but aims to reduce the aeration volume for typical activated sludge so as to save energy.

REFERENCE SIGNS LIST

1 . . . ultralow DO treatment apparatus
2 . . . aeration tank
3 . . . re-oxidation tank
4 . . . settler tank
5 . . . return sludge line
6 . . . diffuser device
7 . . . aeration blower
8 . . . inverter
9 . . . aeration meter
10 . . . thermometer
11 . . . DO meter
12 . . . controller
13 . . . sampling pump
14 . . . measuring device

The invention claimed is:

1. A method for controlling an aeration volume, which is a volumetric flow rate of an aeration gas flowing into an activated sludge treatment apparatus, configured to remove BOD in wastewater or simultaneously remove BOD and nitrogen components in wastewater by performing aeration treatment while a dissolved oxygen concentration (hereinafter referred to as DO) of an activated sludge mixed liquor in an aeration tank is maintained at 0.5 mg/l or lower (hereinafter this treatment is referred to as ultralow DO treatment), the method comprising:

(1-0) acquiring an aeration volume correlation, wherein an aeration volume measuring device (hereinafter referred to as the measuring device) draws the activated sludge mixed liquor in the aeration tank into the measuring device and aerates the activated sludge mixed liquor to determine a measuring device aeration volume G, so as to acquire a correlation (G=F(Gr), meaning G is a function of Gr) between an aeration volume Gr in the aeration tank and the aeration volume G in the measuring device at which a DO value of the aeration tank equals a DO value of the measuring device;

(1-1) performing an aeration operation in the measuring device during ultralow DO treatment operation, wherein the activated sludge mixed liquor is sampled into the measuring device from the aeration tank in an ultralow DO treatment operation and aerated at an aeration volume G1 (G1>G2) to increase DO of the activated sludge mixed liquor, and then aeration is stopped, where G2 represents an aeration volume of the measuring device corresponding to an aeration volume Gr2 of the aeration tank at the time of the ultralow DO treatment operation and G2 is calculated from the correlation (G2=F(Gr2));

(1-2) acquiring oxygen consumption rate Rr and equilibrium DO value C1, where a temporal change in DO value (C), (dC(t)/dt), is expressed by formula (1):

$$dC(t)/dt = K_L a(Cs-C(t))-Rr \qquad \text{formula(1)}$$

where $K_L a$ is an overall mass transfer coefficient, Cs is a saturated dissolved oxygen concentration, and Rr is an oxygen consumption rate of the activated sludge mixed liquor under an aerobic condition, (1-2-1) Rr is obtained on a basis of changes in C(t) during a DO decreasing process when aeration is stopped, and (1-2-2) an equilibrium DO value C1 (dC(t)/dt=0, C(t)=C1) under temporarily intensified aeration is obtained by repeat calculation by varying $K_L a$ or C1 on a basis of changes in C(t) during a DO increasing process under intensified aeration and a relationship of formula (2):

$$K_L a(Cs-C1) = Rr \qquad \text{formula(2)};$$

(1-3) acquiring an appropriate aeration volume G2* of the measuring device, wherein, an aeration volume G0 at which an oxygen supply capacity by aeration equals an oxygen consumption rate of the activated sludge mixed liquor is obtained by formula (3') where G1 represents an aeration volume under temporarily intensified aeration and Ea1 represents an oxygen dissolution efficiency during the temporarily intensified aeration, the appropriate aeration volume G2* in the measuring device during the ultralow DO treatment operation is obtained by repeat calculation using formula (3):

$$G0 = ((Cs-C1)/Cs) \cdot (Ea1/Ea0) \cdot G1 \qquad \text{formula(3')}$$

$$G2^* = k \cdot ((Cs-C1)/Cs) \cdot (Ea1/Ea2) \cdot G1 \qquad \text{formula(3)}$$

where Ea0 and Ea2 are respectively oxygen dissolution efficiencies at aeration volumes G0 and G2* and are acquired from a relationship formula of Ea and G obtained by experiments, and where k is a proportionality factor that derives the appropriate aeration volume G2* under an ultralow DO treatment condition from the calculated appropriate aeration volume based on formula (3'), an optimum value of k is acquired by measuring aeration volumes under one or more treatment conditions, and an optimum value of k corresponding to the ultralow DO treatment condition is substituted into formula (3);

(1-4) acquiring an appropriate aeration volume Gr2* of the aeration tank, wherein the aeration volume Gr2* of the aeration tank corresponding to the aeration volume G2* of the measuring device obtained in (1-3) is obtained from the correlation (G2*=F(Gr2*)); and (1-5) controlling to maintain the appropriate aeration volume during the ultralow DO treatment operation, wherein, over one or more calculation periods, setting of the aeration volume of the aeration tank to the appropriate aeration volume Gr2* obtained in (1-4) is carried out for each calculation period.

* * * * *